June 6, 1944.     O. A. BANNER     2,350,865
HYDRAULIC TRANSMISSION
Filed Aug. 22, 1941     6 Sheets-Sheet 1

Otto A. Banner
INVENTOR
BY
ATTORNEY

Otto A. Banner
INVENTOR

BY
ATTORNEY

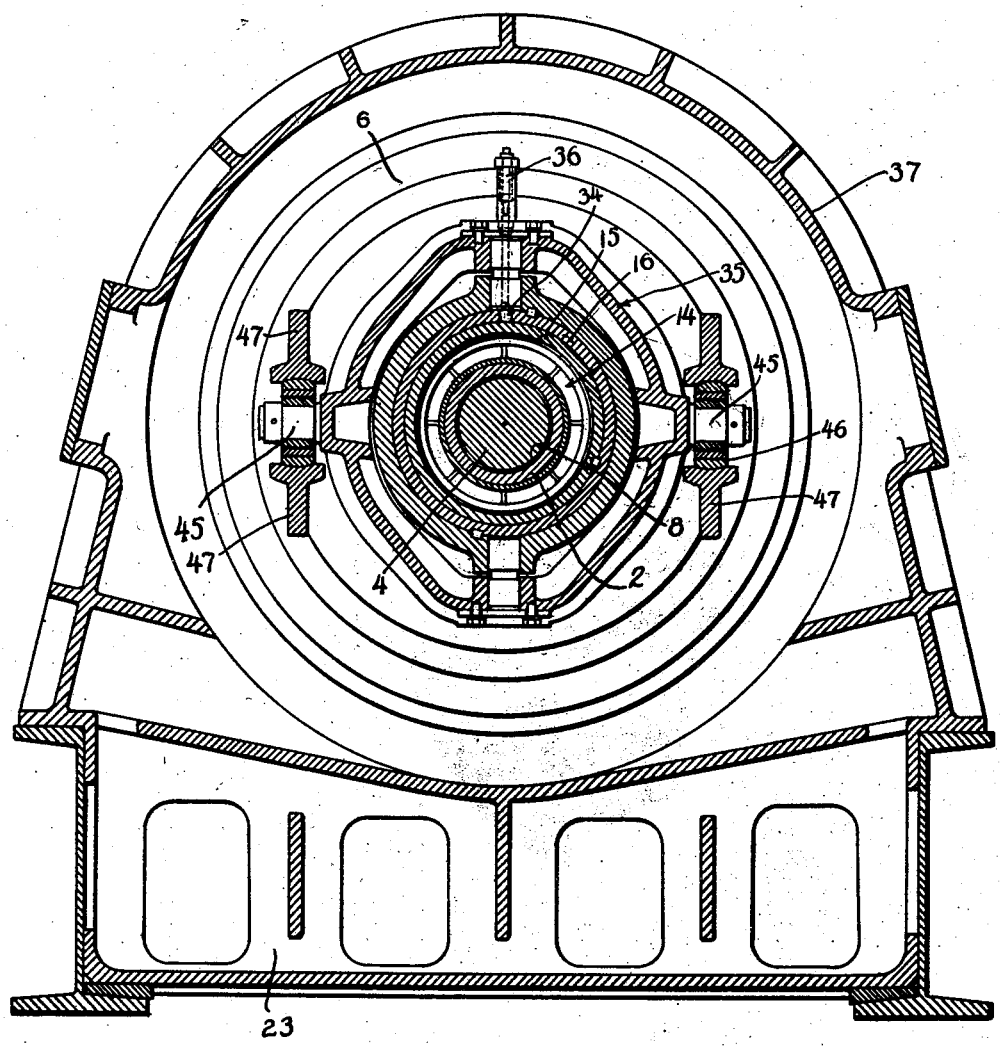

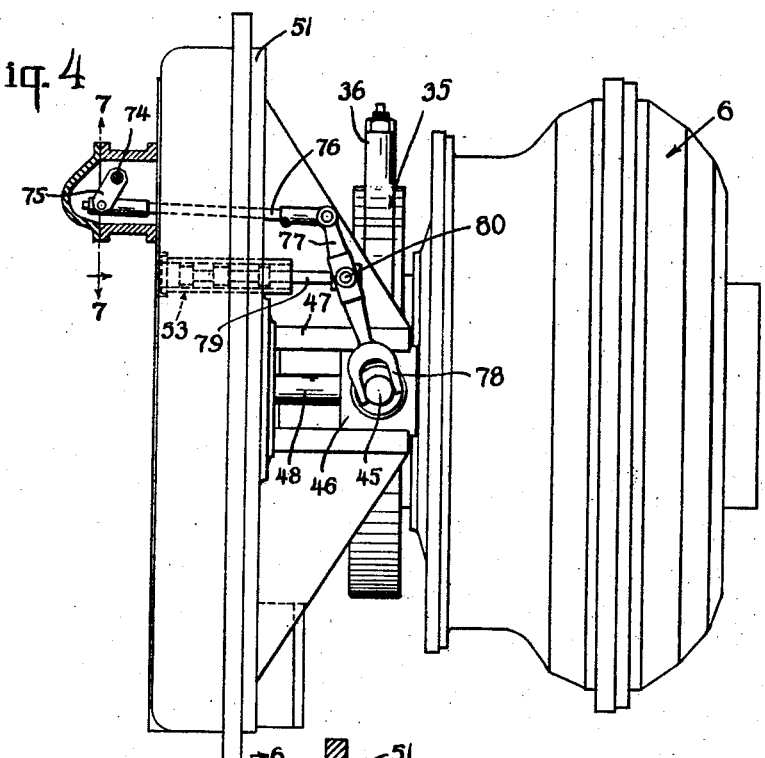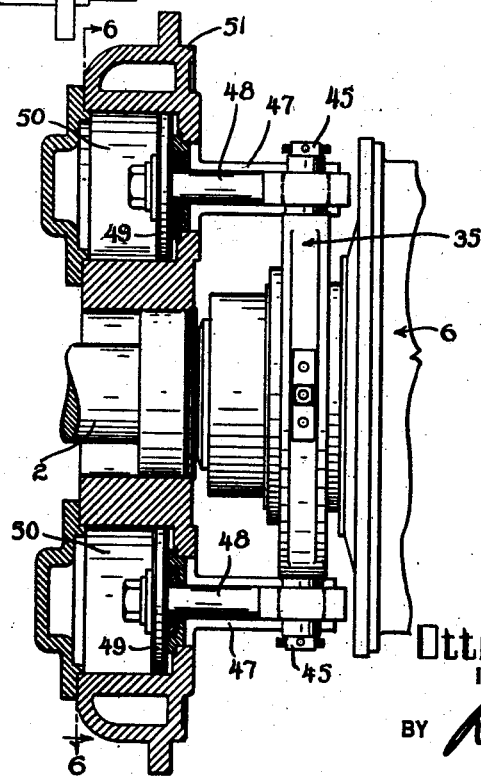

June 6, 1944.　　　O. A. BANNER　　　2,350,865
HYDRAULIC TRANSMISSION
Filed Aug. 22, 1941　　　6 Sheets-Sheet 5

Otto A. Banner
INVENTOR
BY
ATTORNEY

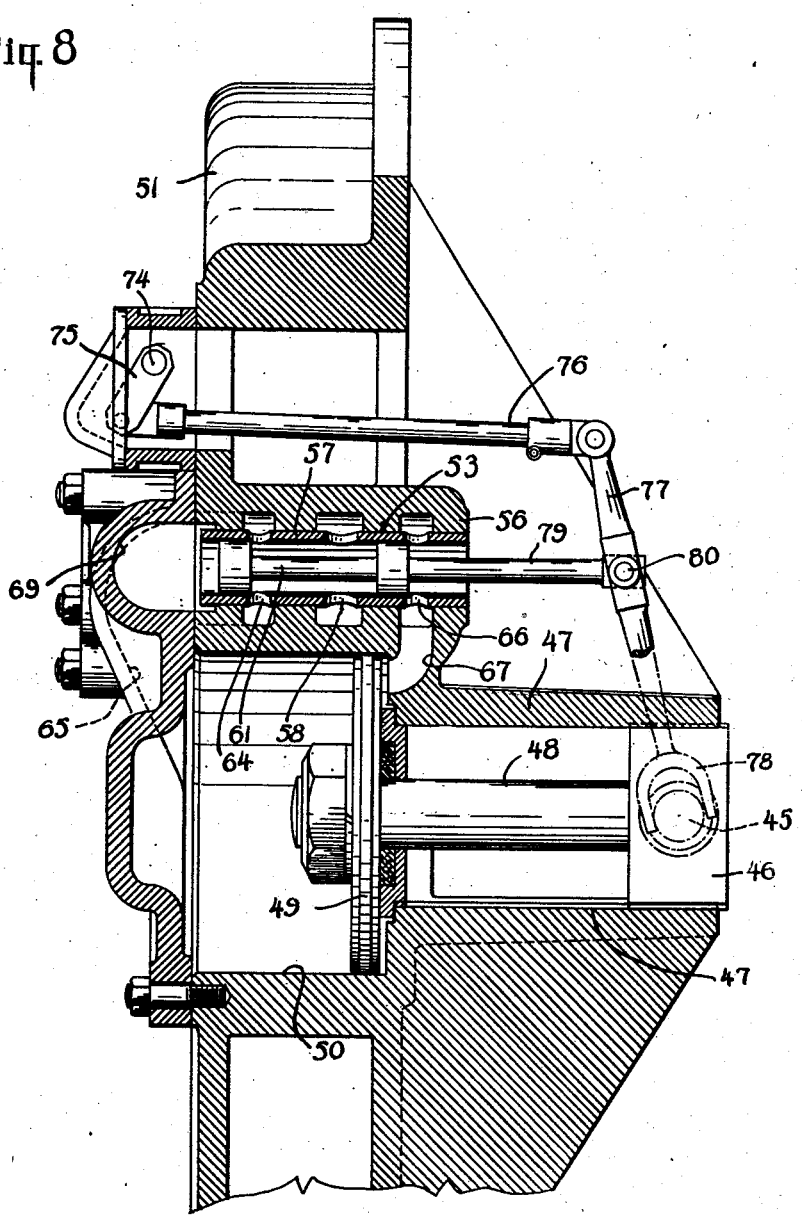

Patented June 6, 1944

2,350,865

UNITED STATES PATENT OFFICE 2,350,865

HYDRAULIC TRANSMISSION

Otto A. Banner, Highland Park, N. J.

Application August 22, 1941, Serial No. 407,887

5 Claims. (Cl. 60—54)

This invention relates to power transmissions, and more particularly to hydraulic transmissions of that type including a primary or driving assembly which embodies a primary or pressure producing impeller, a secondary or driven assembly embodying a turbine wheel, and a shiftable vane system, shiftable to control the directional operation and the percentage of maximum operation of the transmission.

An object of the present invention is to provide, in a hydraulic transmission as specified, a construction and arrangement of parts embodying a fluid circulating pump constructed and designed so that the desired system pressure is maintained in all parts of the transmission at all times, the fluid pump automatically acting to maintain such pressure.

Another object of the present invention is to provide a hydraulically operated means for shifting the guide vane system of the transmission, the hydraulic system of which is connected into the hydraulic system of the transmission, and further to provide a pump for the fluid of the hydraulic system which will automatically create the necessary pressure in the system upon operation of the shifting mechanism.

A further object of the invention is the provision of novel arrangement and construction of primary and secondary shafts, bearings therefor, and shifting means for the shiftable vane system whereby the alignment and clearances of these parts will not be affected by distortion of the casing or other parts of the transmission.

With these and other objects in view, as may appear from the accompanying specification, the invention consists of various features of construction and combination of parts, which will be first described in connection with the accompanying drawings, showing a

Hydraulic transmission of the preferred form embodying the invention, and the features forming the invention will be specifically pointed out in the claims.

In the drawings:

Figure 3 is a vertical section through the transmission taken on the line 3—3 of Figure 1.

Figure 4 is a fragmentary side elevation of the transmission.

Figure 5 is a fragmentary horizontal section through the transmission taken on the line 5—5 of Figure 2.

Figure 8 is a fragmentary vertical section taken on the line 8—8 of Figure 2.

Figure 1:
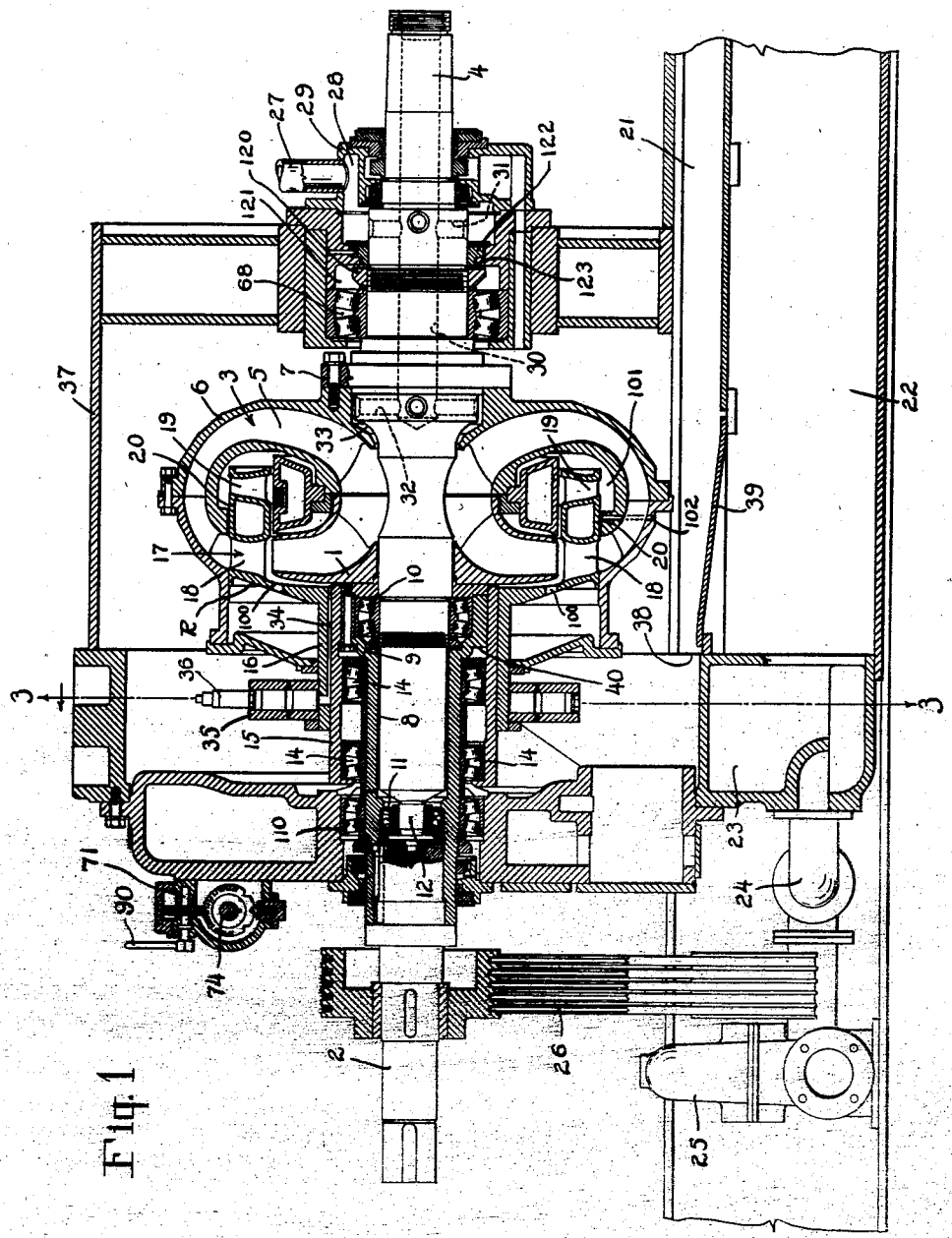
Figure 1 is a longitudinal section through the transmission.
Figure 2:
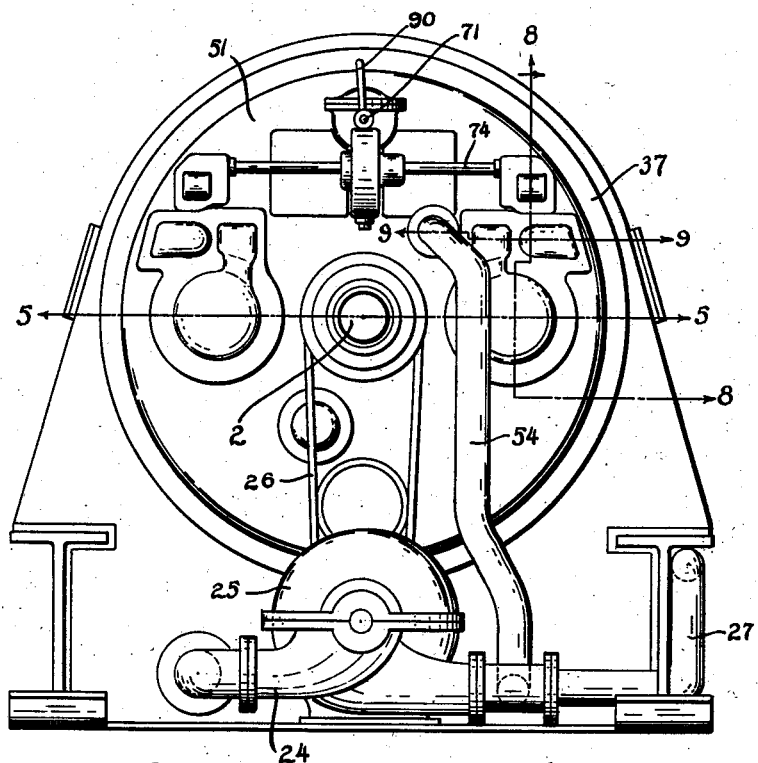
Figure 2 is an end elevation of the transmission.

Referring more particularly to the drawings, the improved hydraulic transmission includes a primary assembly embodying the primary or pressure creating impeller 1, which is carried and driven by the primary shaft 2. The primary shaft 2 is driven from any suitable source of power (not shown). The primary impeller 1 pumps the hydraulic fluid of the hydraulic transmission system into the secondary wheel or turbine 3, which is carried by the secondary shaft 4, which transmits the power from the source (not shown) through the transmission to whatever mechanism (not shown) is being driven thereby.

The blades or vanes 5 of the secondary wheel or turbine 3 are carried by the casing 6, which is connected to the secondary shaft 4 in any suitable manner, as by the construction shown at 7, so that the rotation imparted to the turbine 3 by the fluid pumped by the primary impeller 1 will rotate the secondary shaft 4.

The primary shaft 2 is provided with a longitudinally extending bore 8, extending inwardly thereinto from its inner end, that is, the end to which the pump impeller 1 is connected, and the inner end of the secondary shaft 4 extends into the hollow portion of the bore of the primary shaft 2. The primary shaft 2 is enlarged at its inner end, as shown at 9, and the enlarged end 9 is counterbored and receives a roller bearing structure 10, which carries the primary shaft 2 and serves to maintain the relative position between the turbine and pump impeller of the transmission. A second roller bearing structure 11 is mounted within the bore 8 of the primary shaft 2 and supports the reduced end 12 of the secondary shaft 4.

Suitable roller bearings 14 are mounted outside of the primary shaft 2 and within a sleeve 15, which carries the shifting sleeve 16 of the shiftable guide vane system 17.

The primary shaft 2 is carried, in the head 51, by means of the spherical roller bearing 110 and on the secondary shaft 4 by means of the bearing 10. The casing 6 is rigidly connected with the secondary shaft at 7 and therefore requires no further support. For this reason the ring 35 through the medium of the sleeve 16 has clearance against the sleeve 15. The secondary shaft is supported in spherical roller bearings 11 and 68.

The shiftable guide vane system 17 is interposed between the discharge of the primary or pumping impeller 1 and the inlet of the turbine 3, and embodies a set of "ahead" guide vanes 18, a "reverse" guide vane system 19, and a blank ring 20. It is shiftable longitudinally of the axis of the transmission to vary the directional rotation of the turbine 3, to provide ahead or reverse rotation thereof, and to regulate the percentage of maximum capacity operation of the transmission by varying the relative proportions of either of the vane systems 18 or 19 in active communication with the fluid flow from the primary impeller 1 to the turbine 3, through regulation of the portion of the blank ring 20 which is projected into the fluid flow path. This construction of guide vane system is shown and described in my prior Patent No. 2,251,972, issued August 12, 1941.

The supporting base 21 has a reservoir 22 therein for hydraulic fluid employed in the transmission, and this hydraulic fluid flows through a stabilizing chamber 23, which latter has connection through suitable piping 24 with the suction of the centrifugal fluid supply pump 25. The pump 25 is driven from the primary shaft 2 by a suitable transmission mechanism, indicated at 26. In the drawings this transmission mechanism 26 is shown as a sheave and V-belt drive, but it is to be understood that any suitable type of drive may be employed.

The pump 25 discharges the fluid through the pipe 27 into the chamber 28 formed in the bearing housing 29. From the chamber 28 the fluid flows through the transverse openings 31 into the longitudinal bore 30 of the secondary shaft 4, and outwardly out of the longitudinal bore 30 through the transverse outlet openings 32 and through the space 33 between the secondary shaft 4 and the casing 6 into the suction or inlet of the primary impeller 1.

When the guide vane system is shifted, fluid must pass from one side to the other. For this purpose, holes 100 are provided in the guide vane structure.

Some of the fluid employed in the hydraulic transmission, which of course is oil, passes out of the casing 6 through the passage 34 into the Cardan ring structure 35 and out through the check valve structure 36 into the casing 37 of the transmission, falling downwardly into the bottom of the casing 37, draining therefrom through the drain opening 38, over the drain board 39 and back to the reservoir 22. A part of the fluid pumped leaks into the hollow portion of the primary shaft 2 and into the sleeve 15 to provide lubrication for the various bearings and rotating parts. A second part is by-passed between the ring R and the sleeve 16. This fluid passes through the holes 100. A third part is allowed to pass from the inner space 101 of the turbine directly to the outside through holes 102. As will be noted by particular reference to Figure 1 of the drawings, suitable openings are provided to permit this leakage oil to flow back to the reservoir 22.

A suitable bearing 68 for the secondary shaft 4 is mounted in the bearing housing 29.

By providing the hollow construction of the primary shaft 2, in which the inner end of the secondary shaft 4 is mounted, and the particular arrangement of the bearings 14, sleeves 15 and 16, it will be noted that all of the rotating parts of the transmission are centered or lined up on one axis, so that the centers of the various rotatable elements cannot be thrown out of relative alignment through distortion of the roller bearing structures, distortion of the casing, or misalignment of the bearings due to heat action. Therefore all of the clearance distances or running clearances between the rotating parts of the primary and secondary vane assemblies will be maintained at all times, under all conditions.

The outer end of the enlarged inner end of the primary shaft 2 forms a thrust balancing piston, indicated at 40, which balances any end-wise thrust of the primary or pumping impeller 1, since the space about this balancing piston surface 40 is under the pressure of the fluid employed in the hydraulic transmission.

The pump 25 may comprise any approved type of centrifugal pump which has sufficient capacity to supply the maximum demand of the transmission. Suitable pumps for this purpose are manufactured by the Auto Prime Pump Co. of Cleveland, Ohio, and the Westco Pump Corporation of Davenport, Iowa, as shown in Patents 1,768,313 and 1,879,149, respectively.

It is understood that there is a clearance between the outer surface of the enlarged end 9 of the primary shaft 2 and the sleeve 15 along the enlarged end 9 of the shaft 2, to permit the flow of some of the oil into the space about the balancing end 40 and through the various bearings 14 and other working, rotating parts of the shaft assembly.

The sleeve 16, by means of which the slidable vane system 17 is moved, is slidable upon the sleeve 15, and has the Cardan ring structure 35 connected thereto, as clearly shown in Figure 3 of the drawings. The trunnions 45 of the Cardan ring structure 35 are mounted in cross-heads 46, which slide in suitable ways 47. The cross-heads 46 have piston rods 48 connected thereto, which are attached to pistons 49. These pistons 49 are mounted for reciprocatory movement in cylinders 50, formed in the head 51 of the housing 37. The cylinders 50 are connected through the valve structures 53 with the discharge of the pump 25, through the pipe 54. Thus hydraulic fluid, taken from the reservoir 22, is employed for shifting the pistons 49. In fact, the hydraulic system of the shifting mechanism comprises a secondary or auxiliary hydraulic system to that of the transmission itself.

The valve structures 53 include a valve casing 56, having a ported sleeve 57 mounted therein. The sleeve 57 has a series of ports 58, which communicate with the passage 59, opening into the surge chamber or reservoir 60. This reservoir 60 receives oil, under pressure, from the pump 25 through the pipe or conduit 54.

Figure 9:
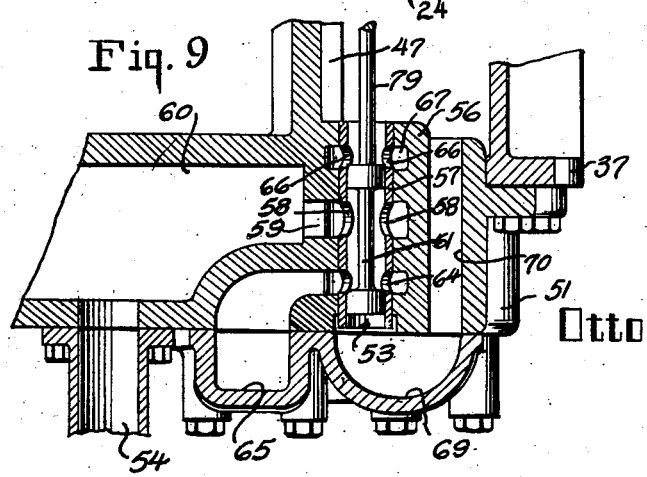
Figure 9 is a detail section taken on the line 9—9 of Figure 2.
Figure 6:
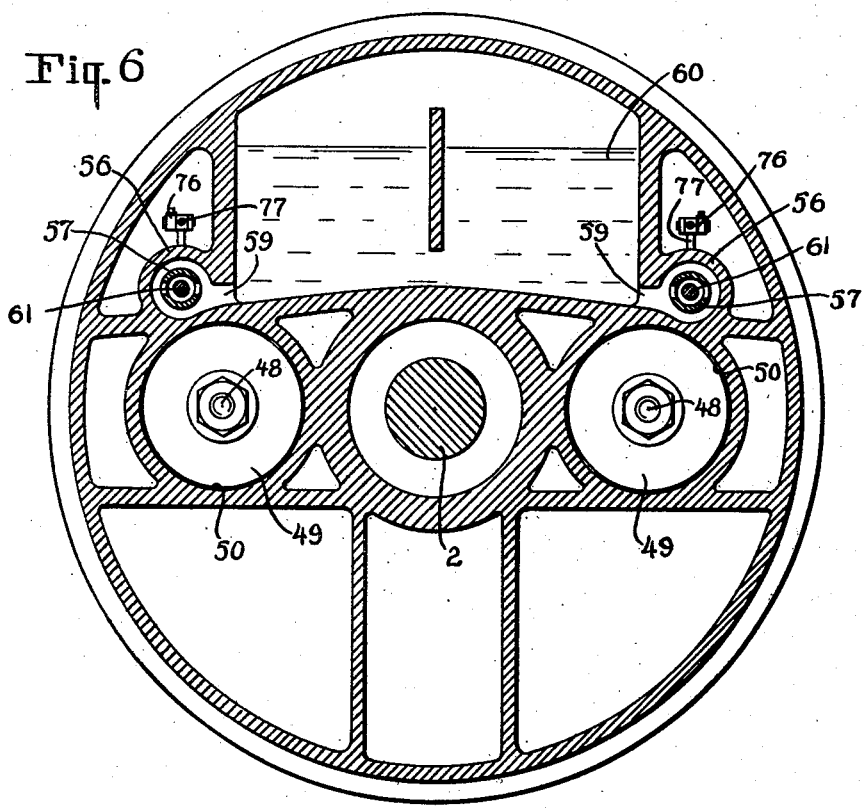
Figure 6 is a vertical section through the transmission taken on the line 6—6 of Figure 5.
Figure 7:
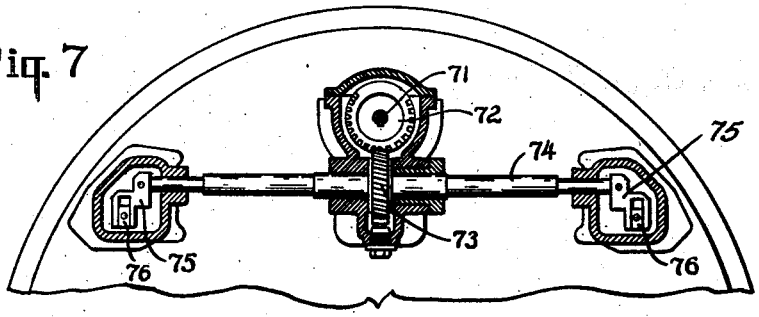
Figure 7 is a detail vertical section through the transmission taken on the line 7—7 of Figure 4.

A plunger or piston valve 61 is mounted in the sleeve 57 for reciprocatory movement therein, and when the piston valve 61 is positioned as shown in Figure 9 of the drawings, that is, in its outward position, oil will flow from the chamber 60 through the ports 58, longitudinally in the sleeve 57, and out through ports 64 into the passage 65, which leads into the cylinders 50, for action against the pistons 49 therein, to move them inwardly for shifting the guide vane ring towards the right (in Figure 1 of the drawings). At the same time, oil on opposite sides of the pistons will flow from the cylinders 50 through the passages 67, the ports 66 and into the sleeves 57 and then into the housing 37. Upon adjustment of the piston valves 61 in the reverse direction, oil will flow from the chamber 60 and through the ports 58, longitudinally in the sleeves 57, through the ports 68 and the respective passages 67 and into the cylinders 50. This will cause the pistons 49 to move to the left, as when viewing Figures 5 and 8. Oil will then flow from the cylinders 50 through the passages 69 and 70 and to the housing 37. Thus the oil flowing into the housing 37 may flow through the openings 38 and back to the reservoir 22.

A novel, easily operated mechanism is provided for shifting the piston valves 61, comprising a handle 90 mounted on a pin or shaft 71, which latter has a segmental gear thereon. The segmental gear 72 on the shaft 71 meshes with a worm gear 73, mounted on a rocker shaft 74, so that the shaft 74 will be rotated through a part of a rotation upon each pivotal movement of the lever 90. The shaft 74 is connected by suitable bell-crank structures 75 to shifting rods 76, which latter are in turn connected to the upper ends of rocker arms 77. The lower, forked ends 78 of the arms 77 are mounted on the trunnions 45, while the stems 79 of the piston valves 61 are pivotally connected to the rocker arms 77 intermediate their ends, as shown at 80. Thus when the lever 90 is shifted to operate the valves 61 to move the shiftable guide vane system in one direction, fluid under pressure will be admitted to the cylinders 50 side of the pistons 49, depending upon the direction of movement of the guide vane ring desired. Consequently, the guide vane ring having been moved or shifted to the position determined by the degree of movement of the lever 90, the cross-heads 46, having moved the proper distance, will, through the medium of the rocker arms 77, have shifted the piston valve 61 into position to cut off further flow of fluid to the cylinders 50 and consequently further movement of the shiftable guide vane ring.

It will be understood that the invention is not to be limited to the specific construction or arrangement of parts shown, but that they may be widely modified within the invention defined by the claims.

What is claimed is:

1. In a hydraulic power transmission, a support, a primary impeller having a hollow shaft rotatably mounted on said support, a secondary wheel having a secondary shaft co-axial with said hollow shaft and rotatably mounted on said support, said secondary shaft projecting into said hollow shaft, axially spaced bearings interposed between the hollow shaft and the secondary shaft to rotatably relate the two shafts and maintain the same in co-axial relationship, a first sleeve mounted on said hollow shaft, bearings between the first sleeve and said hollow shaft to maintain the same in concentric relationship, a guide-vane system interposed between said primary impeller and said secondary wheel and having a second sleeve keyed to said first sleeve for relative longitudinal movement thereon but restrained from relative rotation, a cover fixed to said secondary wheel and enclosing said primary impeller and said guide-vane system and closely embracing said second sleeve, cylinders fixedly related to said support, pistons movable in said cylinders, crosshead means connecting the pistons with said second sleeve and restraining the latter from rotation, said support being provided with a hydraulic fluid reservoir, a circuit for delivering hydraulic fluid to said cover and to all said bearings, means for circulating hydraulic fluid under pressure through said circuit, an auxiliary circuit placing said last-mentioned means in communication with said cylinders for delivering hydraulic fluid under pressure to the cylinders, and means for selectively controlling the admission of hydraulic fluid to said cylinders on either side of said pistons to move the latter in predetermined directions.

2. The invention claimed in claim 1 wherein said support includes a housing comprising a portion of said first-mentioned circuit and having hydraulic fluid return communication with said reservoir, and in which said cylinders are provided with hydraulic fluid return communication with said casing.

3. The invention claimed in claim 1 wherein said first-mentioned circuit includes passage means in said secondary shaft for delivering hydraulic fluid to said cover in an annular stream between the cover and the secondary shaft.

4. The invention claimed in claim 1 wherein said primary shaft, the secondary shaft, said first sleeve and said second sleeve are arranged in telescopic relationship throughout a zone located between the primary impeller and said cylinders.

5. In a hydraulic power transmission, a hydraulic circuit consisting of a primary impeller with primary shafting, a secondary wheel with secondary shafting, a guide-vane system, a cover attached to the secondary wheel and surrounding the primary impeller and the guide-vane system, a sleeve attached to the guide-vane system and having an extension to the outside of the cover, a stationary structure supporting and enclosing said hydraulic circuit and containing a plurality of hydraulic cylinders, a piston for each cylinder, crossheads operatively connected with said pistons, means including a Cardan ring operatively connecting said cross heads with said extension, means supported by said stationary structure to restrain the crossheads from rotation, and means for supplying hydraulic fluid from said hydraulic circuit to said cylinders for operating the pistons.

OTTO A. BANNER.